US011627501B2

(12) United States Patent
Nguyen et al.

(10) Patent No.: US 11,627,501 B2
(45) Date of Patent: Apr. 11, 2023

(54) ENABLING MULTI-RAT CO-CHANNEL COEXISTENCE

(71) Applicant: QUALCOMM Incorporated, San Diego, CA (US)

(72) Inventors: Tien Viet Nguyen, Bridgewater, NJ (US); Sourjya Dutta, San Diego, CA (US); Kapil Gulati, Belle Mead, NJ (US); Gabi Sarkis, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/135,743

(22) Filed: Dec. 28, 2020

(65) Prior Publication Data

US 2022/0086700 A1  Mar. 17, 2022

Related U.S. Application Data

(60) Provisional application No. 63/077,530, filed on Sep. 11, 2020.

(51) Int. Cl.
*H04W 28/26* (2009.01)
*H04W 72/02* (2009.01)
*H04W 24/10* (2009.01)
*H04B 17/318* (2015.01)
*H04W 4/40* (2018.01)
*H04W 92/18* (2009.01)

(52) U.S. Cl.
CPC .......... *H04W 28/26* (2013.01); *H04B 17/318* (2015.01); *H04W 4/40* (2018.02);
(Continued)

(58) Field of Classification Search
CPC .................................................... H04W 28/26
See application file for complete search history.

(56) References Cited

U.S. PATENT DOCUMENTS

2020/0029340 A1   1/2020   He et al.
2020/0146066 A1   5/2020   Nguyen et al.
(Continued)

FOREIGN PATENT DOCUMENTS

WO        2020024208 A1    2/2020
WO   WO-2020150102 A1 *   7/2020   .......... H04B 7/0697
WO        2020173536 A1    9/2020

OTHER PUBLICATIONS

HEPTA7291 "Remaining Issues on NR Sidelink Resource Allocation for V2X", 3GPP Draft, 3GPP TSG RAN WG1 +96, R1-1902697, 3rd Generation Partnership Project (3GPP), Mobile Competence Centre, 650, Route Des Lucioles, F-06921 Sophia-Anti, vol. RAN WG1, No. Athens, Greece, Feb. 25, 2019-Mar. 1, 2019, Feb. 16, 2019 (Feb. 16, 2019), XP051600392, 8 Pages, Retrieved from the Internet: URL:http://www.3gpp.org/ftp/tsg%5Fran/WG1%5FRL1/TSGR1%5F96/Docs/R1%2D1902697%2Ezip [retrieved on Feb. 16, 2019] the whole document.

(Continued)

*Primary Examiner* — Edan Orgad
*Assistant Examiner* — Won Tae C Kim
(74) *Attorney, Agent, or Firm* — Procopto, Cory, Hargreaves & Savitch LLP/Qualcomm Incorporated

(57) ABSTRACT

To facilitate coexistence of a first radio access technology (RAT) and a second RAT, methods, apparatuses, and computer program products are provided. An example method of a first wireless device operating based on a RAT includes receiving a sidelink resource reservation from a second wireless device based on a second RAT, the sidelink resource reservation indicating a first set of resources. The example method further includes determining whether to exclude, from a candidate resource set for the first RAT within a sidelink resource pool for the first RAT, resources that overlap with the set of reserved resources for the second RAT. The example method further includes transmitting a (Continued)

sidelink transmission using one or more sidelink transmission resources selected from the candidate resource set in the sidelink resource pool for the first RAT.

42 Claims, 9 Drawing Sheets

(52) U.S. Cl.
CPC .......... *H04W 24/10* (2013.01); *H04W 72/02* (2013.01); *H04W 92/18* (2013.01)

(56) References Cited

U.S. PATENT DOCUMENTS

| | | | |
|---|---|---|---|
| 2022/0006569 A1* | 1/2022 | Lee | H04W 72/0406 |
| 2022/0086807 A1* | 3/2022 | Dong | H04L 1/08 |
| 2022/0095368 A1* | 3/2022 | Yu | H04W 74/0866 |

OTHER PUBLICATIONS

Interdigital, Inc: "In-Device Coexistence Between LTE and NR V2X Sidelinks", 3GPP Draft, R1-1912741, 3GPP TSG RAN WG1 #99, 3rd Generation Partnership Project (3GPP), vol. RAN WG1, No. Reno, USA, Nov. 18, 2019-Nov. 22, 2019, Nov. 8, 2019 (Nov. 8, 2019), XP051820177, 2 Pages, Retrieved from the Internet: URL https://ftp.3gpp.org/tsg_ran/WG1_RL1/TSGR1_99/Docs/R1-1912741. zip R1-1912741 In-device Coexistence between LTE and NRV2X Sidelinks final.docx [retrieved on-Nov. 8, 2019] the whole document.
International Search Report and Written Opinion—PCT/US2021/045960—ISA/EPO—dated Dec. 6, 2021.

\* cited by examiner

ENABLING MULTI-RAT CO-CHANNEL COEXISTENCE

CROSS-REFERENCE TO RELATED APPLICATION

This application claims the benefit of U.S. Provisional Application Ser. No. 63/077,530, entitled "ENABLING MULTI-RAT CO-CHANNEL COEXISTENCE" and filed on Sep. 11, 2020, which is expressly incorporated by reference herein in its entirety.

INTRODUCTION

The present disclosure relates generally to communication systems, and more particularly, to sidelink communication based on multiple radio access technologies (RATs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a first wireless device operating based on a first radio access technology (RAT) is provided. The method includes receiving a sidelink resource reservation from a second wireless device based on a second RAT, the sidelink resource reservation indicating a first set of resources. The example method further includes determining whether to exclude, from a candidate resource set for the first RAT within a sidelink resource pool for the first RAT, resources that overlap with the set of reserved resources for the second RAT. The example method further includes transmitting a sidelink transmission using one or more sidelink transmission resources selected from the candidate resource set in the sidelink resource pool for the first RAT.

In another aspect, an aspect of the disclosure, an apparatus for wireless communication at a first wireless device operating based on a first radio access technology (RAT) is provided. The apparatus includes means for receiving a sidelink resource reservation from a second wireless device based on a second RAT, the sidelink resource reservation indicating a first set of resources; means for determining whether to exclude, from a candidate resource set for the first RAT within a sidelink resource pool for the first RAT, resources that overlap with the set of reserved resources for the second RAT; and means for transmitting a sidelink transmission using one or more sidelink transmission resources selected from the candidate resource set in the sidelink resource pool for the first RAT.

In another aspect, an aspect of the disclosure, an apparatus for wireless communication at a first wireless device operating based on a first radio access technology (RAT) is provided. The apparatus includes a memory and at least one processor coupled to the memory. The memory and the at least one processor may be configured to receive a sidelink resource reservation from a second wireless device based on a second RAT, the sidelink resource reservation indicating a first set of resources. The memory and the at least one processor may be further configured to determine whether to exclude, from a candidate resource set for the first RAT within a sidelink resource pool for the first RAT, resources that overlap with the set of reserved resources for the second RAT. The memory and the at least one processor may be further configured to transmit a sidelink transmission using one or more sidelink transmission resources selected from the candidate resource set in the sidelink resource pool for the first RAT.

In another aspect, a non-transitory computer-readable storage medium for wireless communication at a first wireless device operating based on a first radio access technology (RAT) is provided. The computer-readable storage medium stores computer executable code, the code when executed by a processor may cause the processor to receive a sidelink resource reservation from a second wireless device based on a second RAT. The sidelink resource reservation may be reserving a first set of resources of a sidelink resource pool. The code may further cause the processor to determine whether to exclude, from a candidate resource set for the first RAT within a sidelink resource pool for the first RAT, resources that overlap with the set of reserved resources for the second RAT. The code may further cause the processor to transmit a sidelink transmission using one or more sidelink transmission resources selected from the candidate resource set in the sidelink resource pool for the first RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
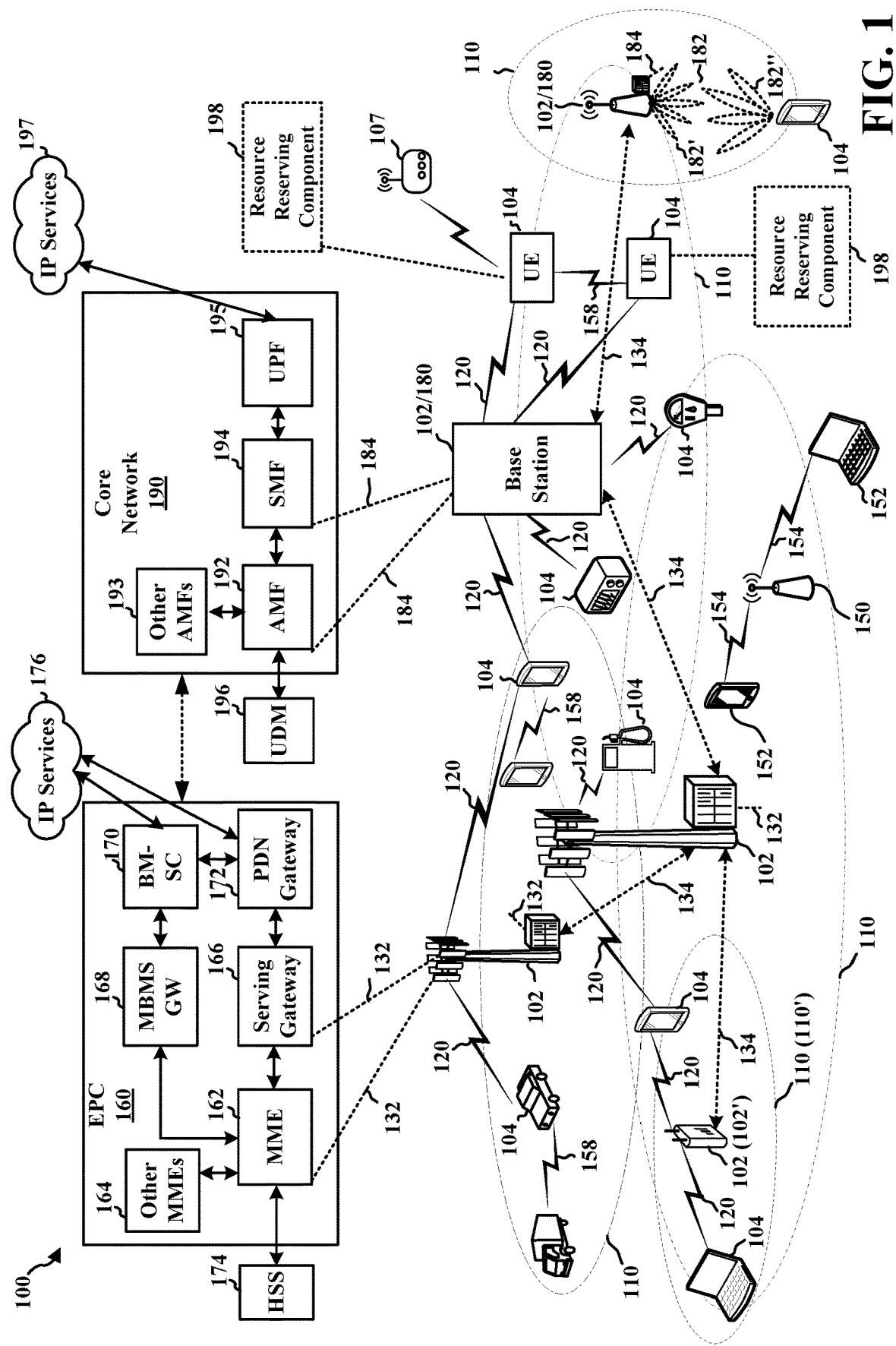
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Some wireless communication may be exchanged directly between wireless devices based on sidelink or a PC5 interface rather than being exchanged between a UE and a base station on an access link or Uu link. An example of sidelink communication includes vehicle-to-everything (V2X) communication. Other examples of sidelink communication include device to device (D2D), Proximity Services (ProSe), etc. In some examples, sidelink communications between different sets of sidelink devices and based on different radio access technologies (RATs) may use overlapping frequency resources, e.g., overlapping channels. Therefore, a transmission based on a first sidelink RAT may use frequency resources that may overlap with transmissions for a second sidelink RAT. In some example, the sidelink communications between the different sets of sidelink devices for the different RATs may collide, e.g., may be transmitted on overlapping time and frequency resources. The colliding sidelink transmissions may negatively impact system performances of the different RATs.

The term "sidelink transmission resources" may refer to radio resources such as frequency and time resources used for sidelink transmission. Sidelink transmission resources may be selected from a pool of resources for sidelink transmissions, which may be referred to as a "sidelink resource pool" that defines subsets of time resources and resource blocks available for various sidelink transmission/receptions. Within the sidelink resource pool, a set of resources may be selected/defined as a "candidate resource set" that includes resources available as candidates of resources to be used for a particular transmission. The term "reserved resources" may refer to radio resources reserved for a transmission, whether reserved by the UE or by other sidelink UEs.

Aspects presented herein enable a sidelink device that operates based on a first sidelink RAT to consider wireless resources that may be used for sidelink communication of a second sidelink RAT when selecting resources for sidelink transmissions to other sidelink devices operating based on the first sidelink RAT. For example, a UE (or other sidelink device) that operates based on NR may exclude, from a candidate resource set, one or more resources that are reserved by an LTE sidelink device. Thus, the NR sidelink device may select a resource for a sidelink transmission that does not overlap with the one or more resources reserved by the LTE sidelink device. It should be noted that the example for the NR and LTE sidelink devices is merely to illustrate the concept. The aspects presented herein may be applied for any combination of a first sidelink RAT and a second sidelink RAT. In some aspects, the sidelink resource reservations may be different for different RATs. Thus, the manner in which the UE of one RAT maintains a candidate resources set for sidelink transmission resources may be different for the two RATs. Aspects presented herein enable, a UE for the first RAT to determine whether to exclude, from a candidate resource set within a sidelink resource pool for the first RAT, resources that overlap with the set of reserved resources for the second RAT. In determining whether to exclude the resources reserved for the second sidelink RAT, a wireless device of the first sidelink RAT may use one or more metrics for the first RAT. For example, the wireless device may apply a reference signal received signal (RSRP) threshold or a priority metric of the first RAT. In some aspects, the sidelink UE may use one or more metrics that are different than the metrics applied for the first RAT. For example, the wireless device of the first sidelink RAT may apply a higher RSRP priority level to the reservation, apply a lower RSRP threshold to the reservation, or use a distance between the sidelink devices to determine whether to exclude the reserved resources of the other sidelink RAT. The wireless device may then transmit a sidelink transmission using one or more sidelink transmission resources selected from the candidate resource set in the sidelink resource pool for the first RAT.

As one non-limiting example, the aspects presented herein may be applied by an NR V2X UE to handle resources reserved for LTE V2X transmissions. The aspects presented herein may be similarly applied for other sidelink device and for any combination of a first sidelink RAT and a second sidelink RAT. The NR V2X UE may consider the resources, which are reserved for LTE V2X transmission, as reserved resources in a candidate resource set in the sidelink resource pool that the UE uses to select resources for an NR V2X transmission.

For the NR V2X transmissions, the UE may select sidelink transmission resources that are non-overlapping with the reserved sidelink resources for LTE V2X transmissions to transmit a sidelink communication. In some examples, the UE may treat the LTE sidelink resource reservation as an NR sidelink resource reservation, e.g., applying a similar priority level and/or reference signal received power (RSRP) threshold in order to determine whether to consider the LTE sidelink resources as reserved in a resource pool for NR sidelink. In some examples, the NR V2X UE may treat the LTE sidelink resource reservation as a different NR sidelink reservation, e.g., applying a new mechanism for handling the resource reservation that is different than for other NR sidelink reservations.

The NR V2X UE may apply a priority level based on LTE sidelink, based on NR sidelink, or a new or highest priority level for NR sidelink. The NR V2X UE may measure RSRP for the LTE V2X resource reservation based on a measurement on the LTE V2X physical sidelink control channel (PSCCH) and/or a measurement on the LTE V2X physical sidelink shared channel (PSSCH). In some examples, the NR V2X UE may make the determination of whether to consider the resources as reserved based on a weighted combination of the measurements on the PSCCH and the PSSCH. In some examples, the NR V2X UE may apply scaling to the RSRP measurement for the LTE sidelink resource reservation before comparing the RSRP measurement to a threshold for NR sidelink resource management.

In some examples, the NR V2X UE may consider, as reserved, an expanded set of frequency resources for the LTE sidelink resource reservation, e.g., up to the whole bandwidth of the sidelink resource pool.

FIG. 1 is a diagram illustrating an example of a wireless communications system and an access network 100. Some wireless communication networks may include sidelink communication, such as V2X, D2D, ProSe, or other sidelink communication.

Vehicle-based communication devices may include communication from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications.

Referring again to FIG. 1, in certain aspects, a UE 104, e.g., a transmitting Vehicle User Equipment (VUE) or other UE, may be configured to transmit messages directly to another UE 104. The communication may be based on V2X or other D2D communication, such as Proximity Services (ProSe), etc. Communication based on V2X and/or D2D may also be transmitted and received by other transmitting and receiving devices, such as Road Side Unit (RSU) 107, etc. Aspects of the communication may be based on PC5 or sidelink communication e.g., as described in connection with the example in FIG. 2. Although the following description may provide examples for V2X/D2D communication in connection with 5G NR, the concepts described herein may be applicable to other similar areas, such as LTE, LTE-A, CDMA, GSM, and other wireless technologies.

A UE 104, Road Side Unit (RSU) 107, or other sidelink device may include a resource reserving component 198 configured to receive a sidelink resource reservation from a second wireless device based on a second RAT. The sidelink resource reservation indicating a first set of resources of a sidelink resource pool. The resource reserving component 198 may be further configured to determine whether to exclude, from a candidate resource set for the first RAT within a sidelink resource pool for the first RAT, resources that overlap with the set of reserved resources for the second RAT. The resource reserving component 198 may be further configured to transmit a sidelink transmission using one or more sidelink transmission resources selected from the candidate resource set in the sidelink resource pool for the first RAT.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although beamformed signals are illustrated between UE 104 and base station 102/180, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or Core Network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
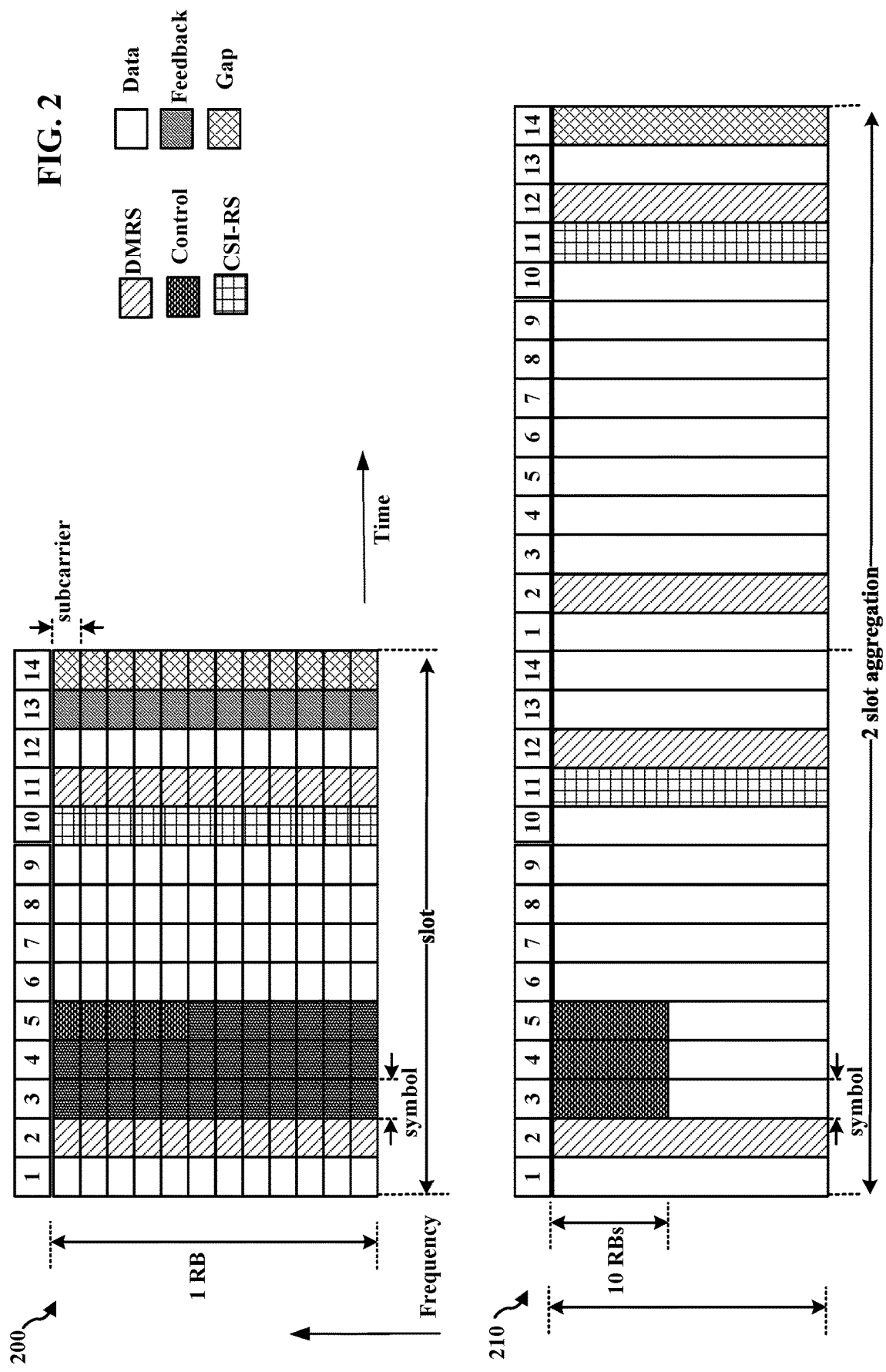
FIG. 2 illustrates example aspects of a sidelink slot structure.

FIG. 2 illustrates example diagrams 200 and 210 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates an example two-slot aggregation, e.g., an aggregation of two 0.5 ms TTIs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information, e.g., along with demodulation RS (DMRS). FIG. 2 also illustrates that symbol(s) may comprise CSI-RS. The symbols in FIG. 2 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 2. Multiple slots may be aggregated together. FIG. 2 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
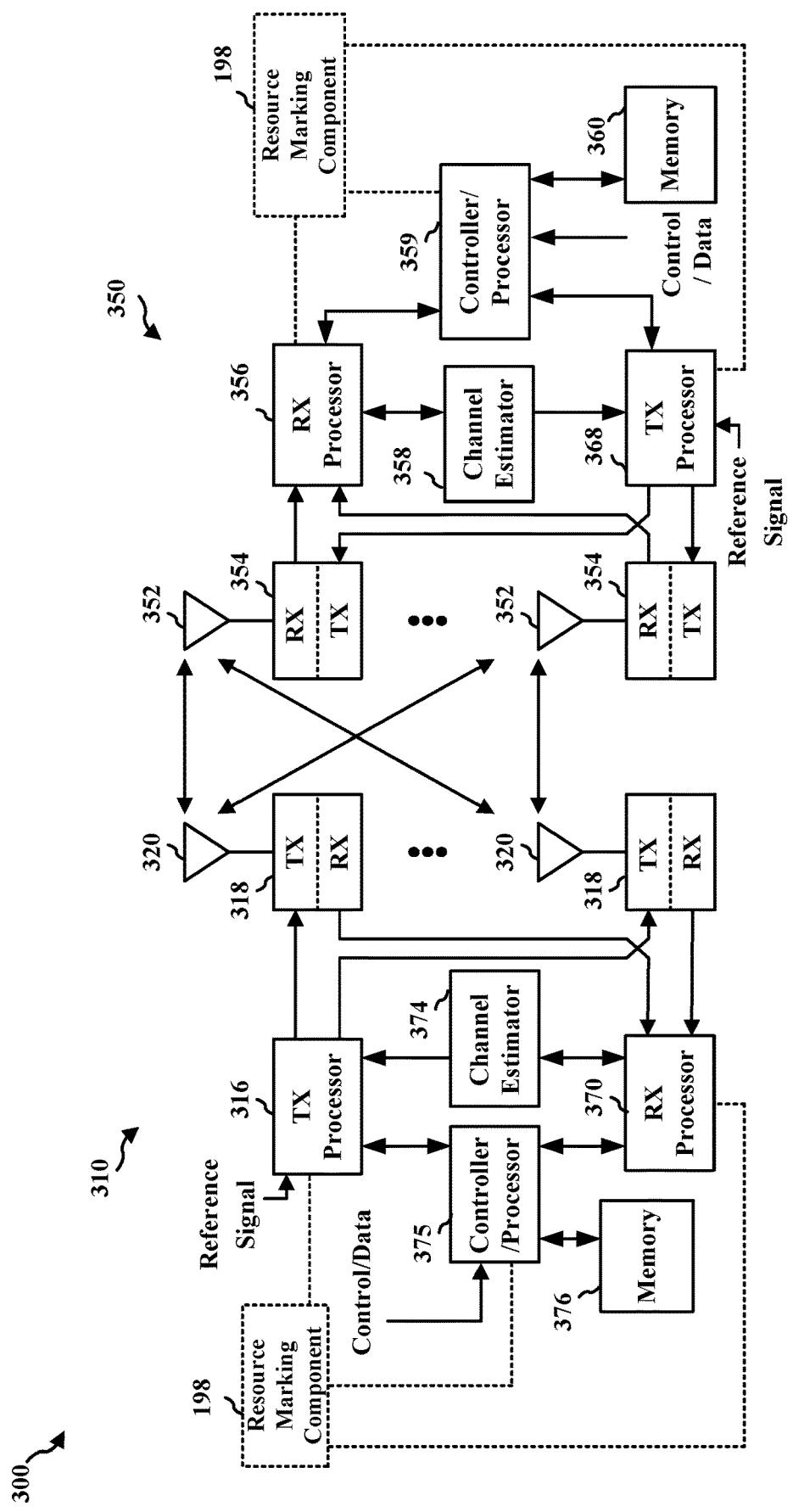
FIG. 3 is a diagram illustrating an example of a first wireless device and a second wireless for sidelink communication.

FIG. 3 is a block diagram 300 of a first wireless communication device 310 in communication with a second wireless communication device 350. In some examples, the devices 310 and 350 may communicate based on V2X or other D2D communication. The communication may be based, e.g., on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with resource reserving component 198 of FIG. 1.

In some wireless communication environments, sidelink communication based on multiple RATs may use overlapping frequency resources, e.g., overlapping channels. The transmissions based on one RAT may collide, e.g., overlap in time and frequency, with the transmission based on the other RAT. The collision may reduce the sidelink performance of both RATs.

Figure 4:
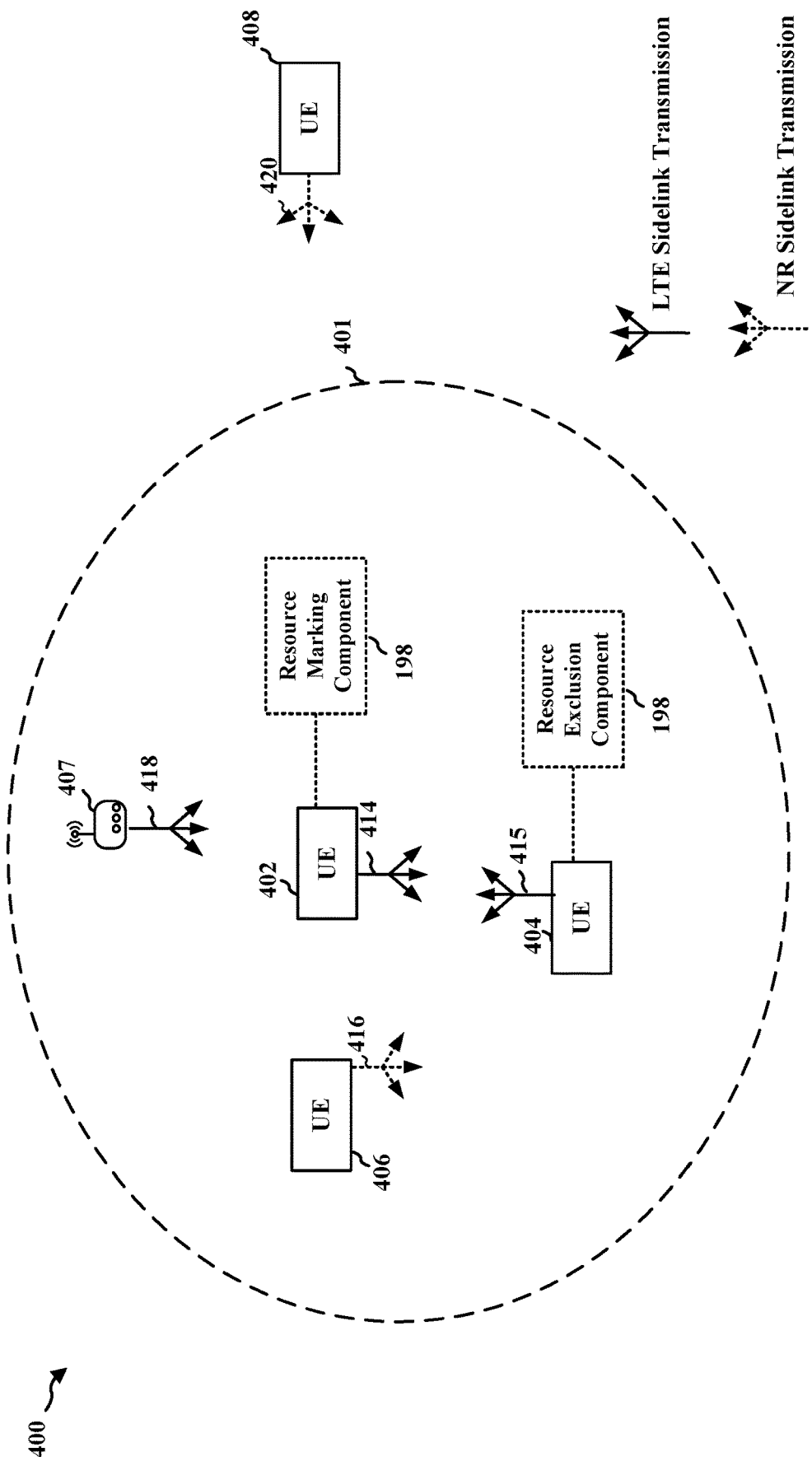
FIG. 4 illustrates an example of wireless communication between devices based on sidelink communication.

FIG. 4 illustrates an example 400 of sidelink communication between devices. The communication may be based on a slot structure comprising aspects described in connection with FIG. 2. For example, transmitting UE 402 may transmit a transmission 414, e.g., comprising a control channel and/or a corresponding data channel, that may be received by receiving UE 404. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. Although FIG. 4 illustrates a wireless signal 425 between the UE 402 and the UE 404, the transmission 414 may be a unicast sidelink transmission between the UE 402 and the UE 404, a multicast sidelink transmission from the UE 402 to multiple UEs, or a broadcast transmission for reception by any UE within a transmission range. The UEs 402, 404, 406, 408 may each be capable of operating as a transmitting device in addition to operating as a receiving device. Thus, UEs 406, 408 are illustrated as transmitting transmissions 416, 420. Additionally, or alternatively, RSU 407 may receive communication from and/or transmit communication 418 to one or more UEs 402, 404, 406, 408. As the UEs may autonomously select time and frequency resources for sidelink transmissions, the UE 402 and/or 404 may employ a sensing and reservation procedure to identify resources that are reserved by other UEs as a part of selecting time and frequency resources for a sidelink transmission. As well, different UEs may operate based on different RATs. Some UEs of 402, 404, 406, 408 or RSU 407 may include a resource reserving component 198, as described in connection with FIG. 1 that enables the UE to receive sidelink resource reservations for one RAT and to determine whether to exclude, from a candidate resource set for the first RAT within a sidelink resource pool for the first RAT, resources that overlap with the set of reserved resources for the second RAT. The UE may transmit a sidelink transmission using one or more sidelink transmission resources selected from the candidate resource set in the sidelink resource pool for the first RAT.

For example, the UEs 402 and 404 may exchange sidelink communication, such as LTE (e.g., LTE V2X, LTE D2D, etc.) and the UEs 406 and 408 may exchange sidelink communication based on a second RAT, such as NR (e.g., NR V2X, NR D2D, etc.). Although the example may be described for LTE V2X and NR V2X to illustrate the concept, the aspects presented herein may be applied to other sidelink communication based on LTE and NR and may also be applied to other sidelink communication including RATs that are different than NR and LTE.

LTE V2X includes PSCCH and PSSCH that are frequency division multiplexed (FDM) in a same subframe. Discrete Fourier Transform (DFT) OFDM waveform may be used with 15 Kilo-Hertz (kHz) subcarrier spacing (SCS). Separate DFT precode and reference signals (RS) may be used for PSSCH and PSCCH. As illustrated in example 500 in FIG. 5A, PSCCH 502 and PSSCH 504 might not be adjacent in frequency. In some aspects, the two PRBs may be allocated to the LTE PSCCH 502. Sub-channel size may be {5, 6, 10, 15, 20, 25, 50, 75, 100} PRBs for adjacent PSCCH and PSSCH and {4, 5, 6, 8, 9, 10, 12, 15, 16, 18, 20, 30, 48, 72, 96} PRBs for non-adjacent PSCCH and PSSCH. Reservation of resource may be periodic with up to two retransmissions in a period with period values [20, 50], 100, 200, . . . , 1000 milliseconds (ms) with no feedback. reference signal received power (RSRP) for resource selection may be measured on PSSCH DMRS.

Figures 5A, 5B:
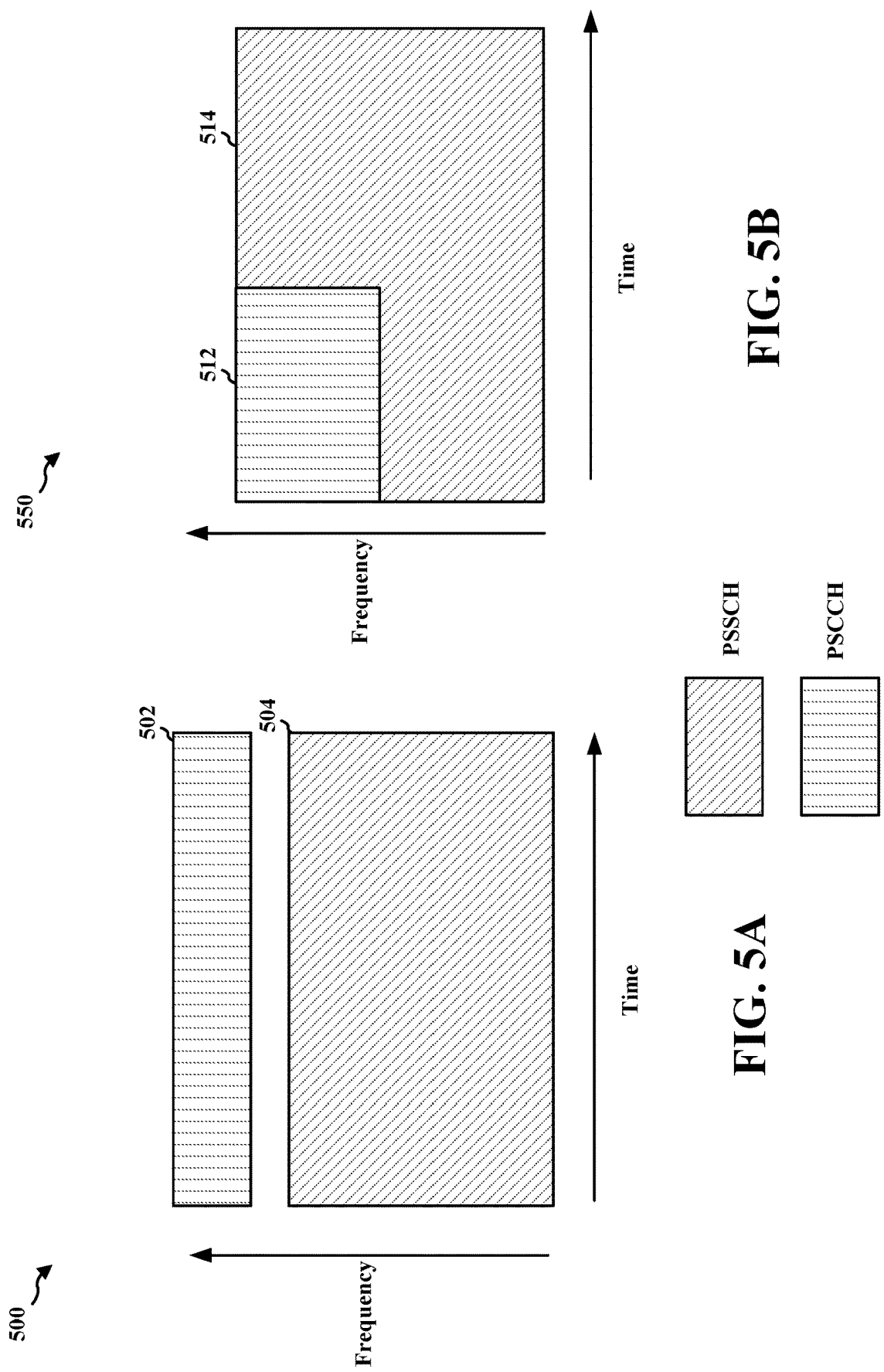
FIGS. 5A and 5B illustrate sidelink transmissions of different RATs.

For NR V2X, as illustrated in example 550 in FIG. 5B, PSCCH 512 and PSSCH 514 are FDMed and time division multiplexed (TDM) in a same subframe. Cyclic prefix orthogonal frequency division multiplexing (CP-OFDM) waveform may be used with [15], 30, [60] kHz SCS. Separate RS may be used for PSCCH 512 and PSSCH 514. 10, 12, 15, 20, or 25 PRBs and 2 or 3 OFDM symbols may be allocated for the PSCCH 512. Sub-channel size may be {10, 15, 20, 25, 50, 75, 100} PRBs. Reservations may be aperiodic or periodic with up to 32 retransmissions with period values 1 to 100, 200, . . . , 1000 ms. Feedback on PSFCH may be optionally enabled. RSRP for resource selection is measured on PSCCH or PSSCH DMRS.

Even though the configurations for NR V2X transmissions for UEs 406 and 408 and LTE V2X transmissions for UEs 402 and 404 are different, the transmissions may be based on overlapping time and frequency resources leading to collisions between NR V2X transmissions and LTE V2X transmissions. The UEs 402 and 404 may reserve resources for the LTE V2X transmissions that overlap with the resources for the NR V2X transmissions. Such collision may adversely impact the performance of both the NR V2X transmissions and LTE V2X transmissions. To mitigate the collision issue, methods, apparatuses, and computer program products are presented herein to facilitate coexistence of sidelink communication for multiple RATs using overlapping transmission resources.

The term "sidelink transmission resources" may refer to radio resources such as frequency and time resources used for sidelink transmission. Sidelink transmission resources may be defined and included in a sidelink resource pool that defines subsets of time resources and resource blocks available for various sidelink transmission/receptions. The term "reserved resources" may refer to radio resources reserved for a transmission. The reservation may be indicated to other devices in sidelink control information, for example. Wireless devices may monitor for reservations from other sidelink devices and may avoid using resources overlapping with the reserved resources in transmissions when selecting sidelink transmission resources.

Figure 6:
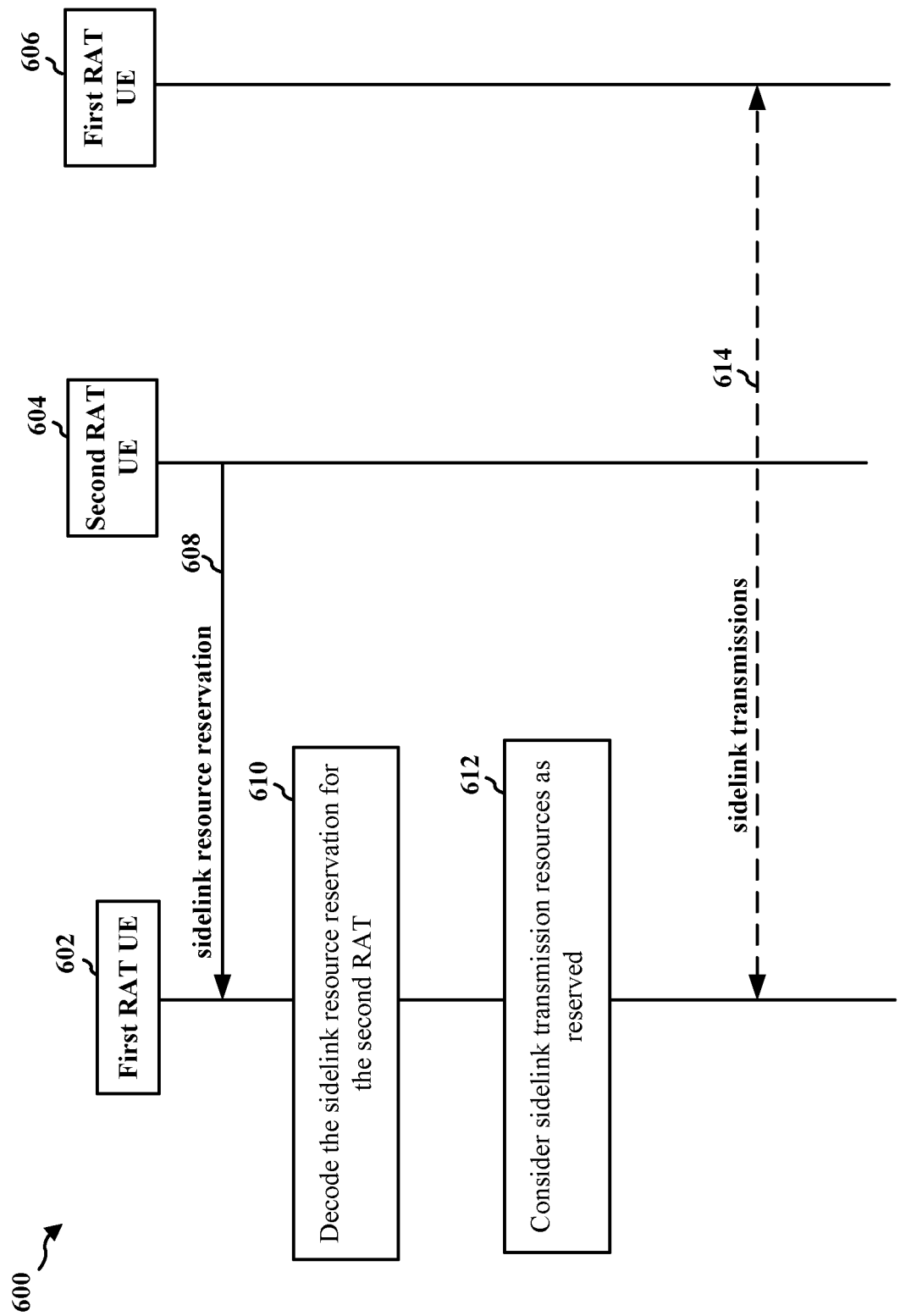
FIG. 6 illustrates an example communication flow between wireless devices.

FIG. 6 illustrates an example communication flow 600 between wireless devices. As illustrated in FIG. 6, a first wireless device (such as a UE) 602 operating on a first RAT (e.g., NR V2X) receives a sidelink resource reservation 608 based on a second RAT (e.g., LTE V2X) from a second wireless device (such as a UE) 604. The first wireless device 602 may be configured to decode the sidelink resource reservation 608 of the other RAT, at 610. In some aspects, the first wireless device 602 may treat the sidelink resource reservation 608 of the second RAT as a periodic reservation for the first RAT. For example, an NR sidelink device may treat an LTE sidelink reservation as an NR resource reservation. In some aspects, the first wireless device 602 may treat the sidelink resource reservation 608 of the other RAT as a special sidelink periodic reservation. For example, an NR sidelink device may treat an LTE sidelink reservation as an NR periodic resource reservation that is handled differently than other NR periodic resource reservations.

After decoding the sidelink resource reservation 608, the first wireless device 602 may consider sidelink transmission resources as reserved, at 612, to avoid collision between sidelink transmissions of the first RAT and sidelink transmissions of the second RAT. The sidelink transmission resources that overlap with the sidelink transmission resources considered as reserved may be excluded from further sidelink transmissions, such as described in connection with FIGS. 7A and 7B. In some aspects, the first wireless device 602 may use sidelink transmission resources that are non-overlapping with the sidelink transmission resources that are considered as reserved. In some aspects, the first wireless device 602 may avoid using sidelink transmission resources that overlap with the sidelink transmission resources that are considered as reserved. In some examples, the first wireless device 602 may exclude the resources that overlap with the sidelink transmission resources that are considered as reserved from candidate resources in a resource pool when selecting resources for a sidelink transmission. The first wireless device 602 may determine to consider the sidelink transmission resources as reserved resources based on a ProSe per packet priority (PPPP) level. The PPPP level may be based on PPPP for the first RAT (e.g. a PPPP for LTE sidelink), a configured PPPP for the second RAT (e.g., a PPPP for NR sidelink), or a highest PPPP for the second RAT (e.g., a highest PPPP for NR sidelink).

In some aspects, the first wireless device 602 may determine whether to consider the sidelink transmission resources as reserved resources, at 612, based on one or more metrics including comparing a measured RSRP for the sidelink resource reservation 608 of the first RAT to a reference signal received power (RSRP) threshold. The RSRP may be measured different between the two RATs and/or may be applied differently between the two RATs. In some aspects, the RSRP threshold may be a function of the PPPP of a transmission packet and the PPPP of the reservation.

For example, in LTE, the RSRP for a sidelink resource reservation may be measured based on PSSCH DMRS. As well, there may be a different power spectral density (PSD) between the RBs comprising the PSSCH and the RBs comprising the PSCCH for an LTE V2X resource reservation. In contrast, an NR V2X UE may measure the RSRP of the resource reservation differently, e.g., PSSCH DMRS, or PSCCH DMRS.

In some aspects, the first wireless device 602 in FIG. 6 may measure the RSRP of the sidelink resource reservation 608 for the second RAT based on a PSCCH DMRS, a PSSCH DMRS, or a combination of both the PSCCH DMRS and the PSSCH DMRS. For example, the first wireless device 602 (as an NR sidelink device) may determine the RSRP based on a weighted average, of the LTE PSCCH DMRS and the LTE PSSCH DMRS.

Additionally, or alternatively, the first wireless device 602 may apply a scaling factor before determining whether the RSRP of the LTE sidelink resource reservation 608 meets the threshold. By applying a scaling factor before determining whether the RSRP of the LTE sidelink resource reservation 608 meets the threshold, the first wireless device 602 may take into account differences in NR and LTE sidelink transmission bandwidth and power spectral density (PSD). For example, there may be a 3 decibel PSD difference between RBs containing PSSCH and RBs containing PSCCH for LTE V2X transmissions. In some examples, in order to refrain from scaling, the UE may apply a scaling factor of 1.

At 612, the first wireless device 602 considers the sidelink transmission resources for sidelink transmission for the first RAT (e.g., an NR sidelink resource pool) as reserved resources based on the sidelink resource reservation 608 for the second RAT. In some aspects, the first wireless device 602 may consider, as reserved, expanded frequency resources based on the sidelink resource reservation 608, e.g., beyond the specific frequency resources reserved by the UE 604. For example, the first wireless device 602 may consider, as reserved, a whole bandwidth that includes resources reserved by the sidelink resource reservation 608.

In some aspects, a PPPP may be defined for sidelink reservations of the second RAT and used by the first wireless device 602 to determine whether to consider, as reserved, the sidelink resources for the first RAT. In some aspects, the PPPP may correspond to a smallest or a minus infinite decibel milliwatt RSRP threshold for sidelink reservations so that radio resources reserved for the second RAT are considered as reserved by the first wireless device 602 if the first wireless device 602 decodes the PSCCH that includes the reservation 608. The first wireless device may consider, as reserved, the resources without an RSRP measurement if the PSCCH is decoded. In some aspects, the first wireless device 602 may use distance based consideration based on a distance between the first wireless device 602 and the UE 604. For example, the first wireless device 602 may consider the sidelink resources in the reservation 608 as reserved resources if the distance between the first wireless device 602 and the UE 604 is within a range. The first wireless device 602 may decode basic safety messages (BSM) from the UE 604 containing location information and may use the location information to determine the distance between the first wireless device 602 and the UE 604 for the distance based consideration. A distance based consideration may be more robust against blocking and non-line of sight (NLOS) conditions.

After considering sidelink transmission resources as reserved based on the sidelink resource reservation 608, the first wireless device 602 may select sidelink transmission resources that do not overlap with the resources that are considered as reserved and use the selected resources for sidelink transmission 614 (e.g., an NR sidelink transmission such as NR V2X) between the first wireless device 602 and a third wireless device 606 operating based on the second RAT. For example, the wireless device may exclude the resources that are considered as reserved from candidate resources when selecting sidelink resources for transmission based on the first RAT.

Figures 7A, 7B:
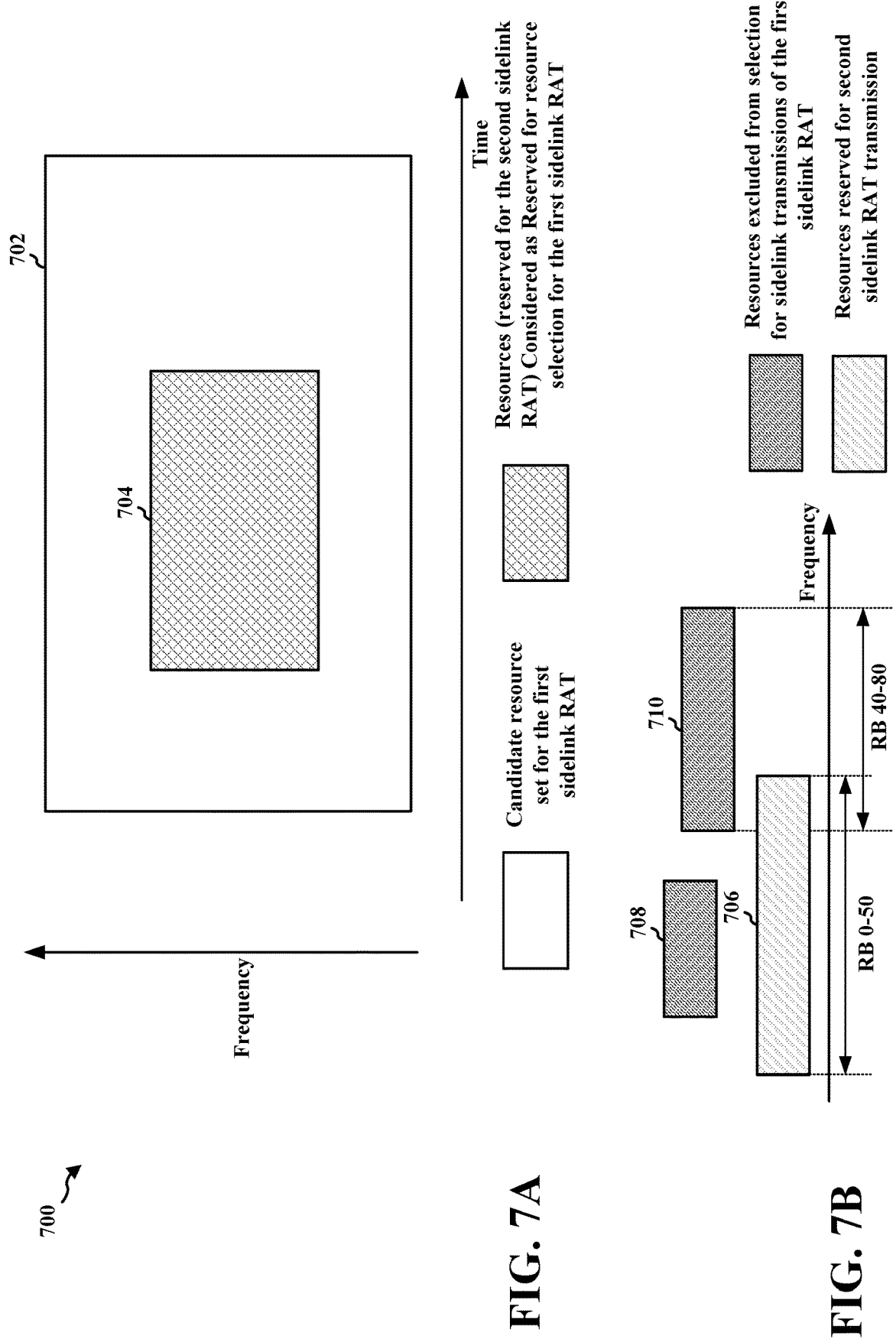
FIGS. 7A and 7B illustrate example resources for sidelink transmission.

As illustrated in example 700 of FIG. 7A, a wireless device operating based on a first RAT, such as the first wireless device 602 described in connection with FIG. 6, may receive a resource reservation indicating sidelink transmission resources 704 from a wireless device operating based on a second RAT, such as the second wireless device 604 described in connection with FIG. 6. The wireless device may consider the sidelink transmission resources 704 as reserved based on the resource reservation from the wireless device operating based on a second RAT and may exclude, from a candidate set of sidelink resources 702 for the first RAT, at least one or more candidate resources that overlap with the sidelink transmission resources reserved for the sidelink transmissions of the second sidelink RAT. In some aspects, a lower layer of the wireless device may determine a subset of resources from which a higher layer may select resources for PSSCH/PSCCH transmissions from the wireless device. The wireless device may exclude candidate resources that meet conditions, such as reception of an SCI from another device indicating a resource reservation for the same sidelink RAT and having an RSRP measurement that meets a threshold. As presented herein, the wireless device may determine to further exclude at least one or more candidate resources from the subset of candidate resources that overlap with the sidelink transmission resources reserved for sidelink transmissions of a different RAT. As with the resources reserved for sidelink transmissions of the same RAT, the UE may determine if one or more conditions are met in order to determine whether to consider the reserved resources for the second RAT sidelink transmission as being reserved resources for resource selection of sidelink resources for the first RAT. If the sidelink transmission resources 704 for the second RAT includes a set of slots numbered 24-32, the set of slots numbered 24-32 may be considered as reserved (which may also be referred to as being marked, marked as reserved, or marked as reserved by an interferer) for purposes of resource selection for the first sidelink RAT. The wireless device may exclude the set of slots numbered 24-32 from the candidate resource set for resource selection for the first sidelink RAT and may refrain from utilizing resources that overlap with the set of slots numbered 24-32 when selecting resources for transmitting PSSCH/PSCCH based on the first RAT. The wireless device may exclude additional resources beyond the specific overlapping resources. The wireless device may refrain from selecting resources that overlap, at least partially, with the resources reserved for the second sidelink RAT transmission, as illustrated in FIG. 7B. FIG. 7B illustrates that RB 0-50 are reserved for the second sidelink transmission 706. For example, the wireless device may refrain from utilizing a set of resources that includes RBs in the same slot that partially or fully overlap the reserved resources for the second sidelink RAT, e.g., as illustrated at 708. The wireless device may also refrain from utilizing a set of resources that partially overlaps the resources reserved for the second sidelink RAT, e.g., RB numbered 40-80, e.g., as illustrated at 710.

Figure 8:
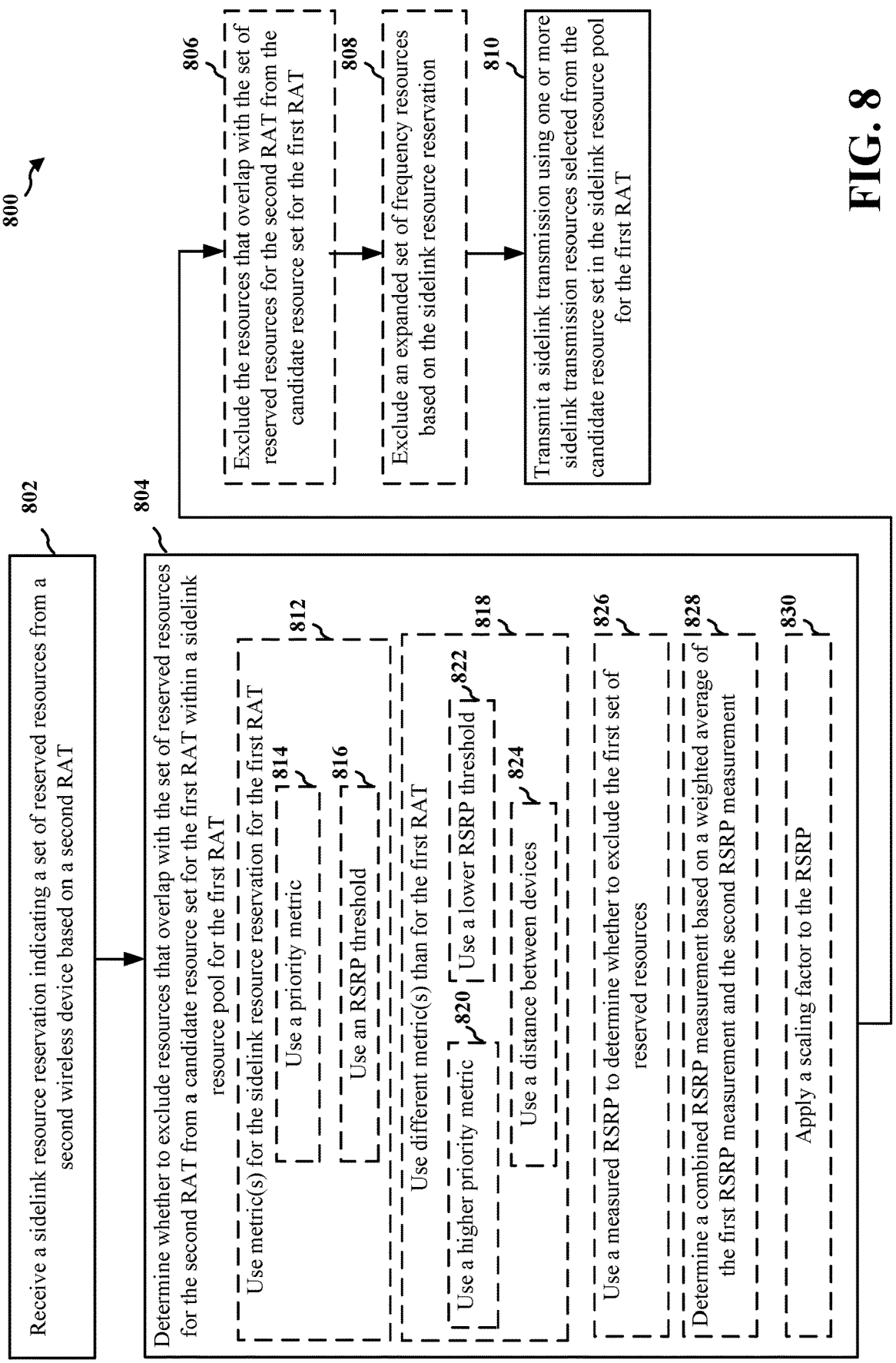
FIG. 8 is a flowchart of a method of wireless communication.

FIG. 8 is a flowchart 800 of a method of wireless communication. method may be performed by a wireless device (e.g., the UE 104, the UE 408, the wireless device 602, the apparatus 902) operating based on a first RAT, such as NR. Optional aspects are illustrated with a dashed line. The method enables the wireless device to help to avoid collisions with sidelink transmissions of a different RAT.

At 802, the wireless device receives a sidelink resource reservation from a second wireless device based on a second RAT. The sidelink resource reservation indicating indicating a set of reserved resources. For example, reception 802 may be performed by sidelink resource reservation reception component 942 of FIG. 9. The reception 802 may include aspects described in connection with LTE sidelink resource reservation 608 of FIG. 6. In some aspects, the first RAT includes NR sidelink communication and the second RAT includes LTE sidelink communication.

At 804, the wireless device determines whether to exclude, from a candidate resource set for the first RAT within a sidelink resource pool for the first RAT, resources that overlap with the set of reserved resources for the second RAT. In some aspects, the wireless device may exclude resources that overlap with the first set of reserved resources for the second RAT from a candidate resource set for the first RAT within a sidelink resource pool for the first RAT, as illustrated at 806. For example, the wireless device may exclude one or more resources that are at least partially overlapping with the first set of reserved resources. The determination at 804 may be performed by sidelink transmission resource determination component 944 of FIG. 9. The determination 804 may include aspects described in connection with 610 and 612 of FIG. 6.

In some aspects, the first wireless device determines whether to exclude, from a candidate resource set for the first RAT within a sidelink resource pool for the first RAT, resources that overlap with the set of reserved resources for the second RAT using one or more metrics for a periodic sidelink resource reservation for the first RAT, as illustrated at 812. In some aspects, the one or more metrics includes a RSRP threshold for the periodic sidelink resource reservation for the first RAT, as illustrated at 814. In some aspects, the one or more metrics includes a priority metric for the periodic sidelink resource reservation for the first RAT as illustrated at 816. In some aspects, the first wireless device determines a priority of the set of reserved resources for the first RAT based on a PPPP level for sidelink communication based on the second RAT, a configured PPPP for the sidelink communication based on the first RAT, or a highest PPPP level for the sidelink communication based on the first RAT. The RSRP threshold may be determined based on the PPPP. In some aspects, the first wireless device determines an RSRP of the set of reserved resources of the first RAT based on an RSRP measurement for one or more of a PSSCH of the sidelink resource reservation from the second wireless device or a PSCCH of the sidelink resource reservation from the second wireless device. For example, the wireless device may use the measured RSRP to determine whether to exclude the first set of reserved resources from the candidate resources set of the first RAT, as illustrated at 826.

In some aspects, the first wireless device determines the RSRP of the set of resources based on a combination of a first RSRP measurement of the PSCCH and a second RSRP measurement of the PSSCH. In some aspects, as part of 804, the wireless device determines, at 828, a combined RSRP measurement based on a weighted average of the first RSRP measurement and the second RSRP measurement. In some aspects, as part of 804, the wireless device applies, at 830, a scaling factor to the RSRP. The scaling factor may be 1 in some aspects. In some aspects, wireless device may exclude an expanded set of frequency resources for the sidelink resource reservation.

In some aspects, the first wireless device determines whether to exclude, from a candidate resource set for the first RAT within a sidelink resource pool for the first RAT, resources that overlap with the set of reserved resources for the second RAT using one or more metrics, that are different than a set of metrics that the first wireless device applies for sidelink resource reservations of the first RAT, as illustrated at 818. In some aspects, the one or more metrics may include a higher priority level for the sidelink resource reservation based on the second RAT than for sidelink resource reservations based on the first RAT, as illustrated at 820.

In some aspects, the one or more metrics includes a lower RSRP threshold for the sidelink resource reservation based on the second RAT than for sidelink resource reservations based on the first RAT, as illustrated at 822. In some aspects, the lower RSRP threshold may include a minus infinite RSRP threshold. In some aspects, the first wireless device determines whether to exclude, from a candidate resource set for the first RAT within a sidelink resource pool for the first RAT, resources that overlap with the set of reserved resources for the second RAT using a distance between the first wireless device and the second wireless device, as illustrated at 824. In some aspects, the first wireless device determines whether to exclude, from a candidate resource set for the first RAT within a sidelink resource pool for the first RAT, resources that overlap with the set of reserved resources for the second RAT based on a measured RSRP, as illustrated at 826.

At 810, the wireless device transmits a sidelink transmission using one or more sidelink transmission resources selected from the candidate resource set in the sidelink resource pool for the first RAT. In some aspects, the wireless device may not select sidelink transmission resources that overlaps with the resources that are considered as reserved, such as illustrated at 808. For example, transmission 810 may be performed by RAT transmission component 946 of FIG. 9. The transmission 810 may include aspects described in connection with 610, 612, and 614 of FIG. 6. In some aspects, the first wireless device excludes an expanded set of frequency resources based on the sidelink resources reservation, as illustrated at 808. For example, the wireless device may exclude a full bandwidth of the sidelink resource pool during time resources reserved by the sidelink resource reservation.

Figure 9:
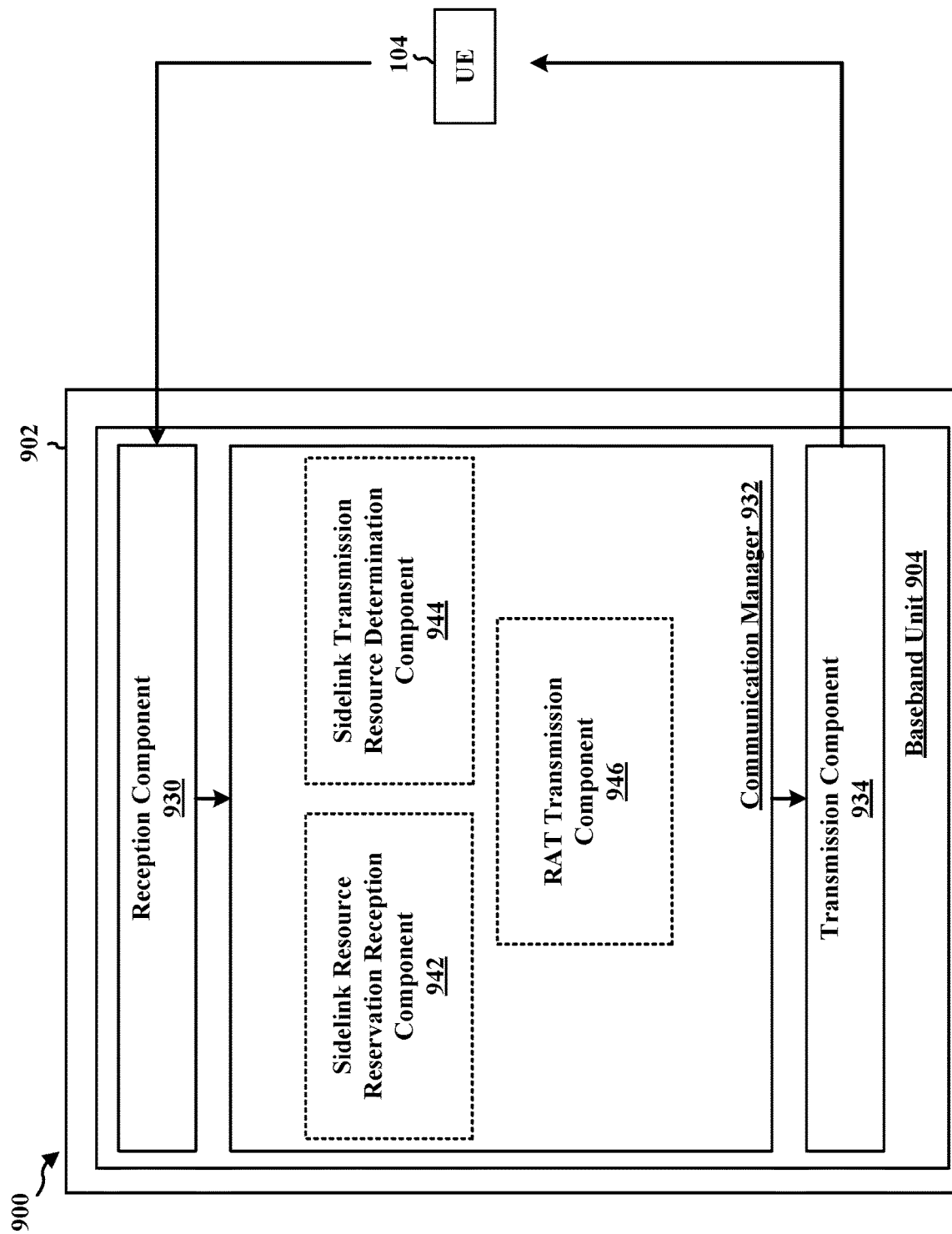
FIG. 9 is a diagram illustrating an example of a hardware implementation for an example apparatus.

FIG. 9 is a diagram 900 illustrating an example of a hardware implementation for an apparatus 902. The apparatus 902 is a wireless device and includes a baseband unit 904. The baseband unit 904 may communicate through a cellular RF transceiver with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the device 310/450 and may include the memory 360/376 and/or at least one of the TX processor 316/368, the RX processor 356/370, and the controller/processor 359/375.

The communication manager 932 includes a sidelink resource reservation reception component 942 that receives a sidelink resource reservation from a second wireless device based on a second RAT, e.g., as described in connection with reception 802 of FIG. 8.

The communication manager 932 further includes a sidelink transmission resource determination component 944 that determines whether to exclude, from a candidate resource set for the first RAT within a sidelink resource pool for the first RAT, resources that overlap with the set of reserved resources for the second RAT, e.g., as described in connection with determination 804 of FIG. 8.

The communication manager 932 further includes a RAT transmission component 946 that transmits a sidelink transmission using one or more sidelink transmission resources selected from the candidate resource set in the sidelink resource pool for the first RAT, e.g., as described in connection with transmission 810 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving a sidelink resource reservation from a second wireless device based on a second RAT (e.g., the sidelink resource reservation reception component 942 of the communication manager 932 comprised in the baseband unit 904 and/or a transceiver). The baseband unit 904 further includes means for determining whether to exclude, from a candidate resource set for the first RAT within a sidelink resource pool for the first RAT, resources that overlap with the set of reserved resources for the second RAT (e.g., the sidelink transmission resource determination component 944 of the communication manager 932 comprised in the baseband unit 904). The baseband unit 904 further includes means for transmitting a sidelink transmission using one or more sidelink transmission resources selected from the candidate resource set in the sidelink resource pool for the first RAT (e.g., the RAT transmission component 946 of the communication manager 932 comprised in the baseband unit 904). The baseband unit 904 further includes means for excluding the resources that overlap with the set of reserved resources for the second RAT from the candidate resource set for the first RAT (e.g., the sidelink transmission resource determination component 944 of the communication manager 932 comprised in the baseband unit 904). The baseband unit 904 further includes means for using one or more metrics for the sidelink resource reservation for the first RAT to determine whether to exclude the set of reserved resources for the second RAT from the candidate resource set for the first RAT within the sidelink resource pool for the first RAT (e.g., the sidelink transmission resource determination component 944 of the communication manager 932 comprised in the baseband unit 904). The baseband unit 904 further includes means for determining an RSRP of the set of reserved resources of the first RAT based on an RSRP measurement (e.g., the sidelink transmission resource determination component 944 of the communication manager 932 comprised in the baseband unit 904). The baseband unit 904 further includes means for determining a combined RSRP measurement based on a weighted average of the first RSRP measurement and the second RSRP measurement (e.g., the sidelink transmission resource determination component 944 of the communication manager 932 comprised in the baseband unit 904). The baseband unit 904 further includes means for applying a scaling factor to the RSRP (e.g., the sidelink transmission resource determination component 944 of the communication manager 932 comprised in the baseband unit 904). The baseband unit 904 further includes means for using a measured reference signal received power (RSRP) to determine whether to exclude the set of reserved resources for the second RAT from the candidate resource set for the first RAT (e.g., the sidelink transmission resource determination component 944 of the communication manager 932 comprised in the baseband unit 904). The baseband unit 904 further includes means for using one or more metrics that are different than the first wireless device applies for sidelink resource reservations of the first RAT to determine whether to exclude the set of reserved resources for the second RAT from the candidate resource set for the first RAT (e.g., the sidelink transmission resource determination component 944 of the communication manager 932 comprised in the baseband unit 904). The baseband unit 904 further includes means for excluding an expanded set of frequency resources based on the sidelink resource reservation (e.g., the sidelink transmission resource determination component 944 of the communication manager 932 comprised in the baseband unit 904). The baseband unit 904 further includes means for using a distance between the first wireless device and the second wireless device to determine whether to exclude the set of reserved resources for the second RAT from the candidate resource set for the first RAT (e.g., the sidelink transmission resource determination component 944 of the communication manager 932 comprised in the baseband unit 904).

The aforementioned means may be one or more of the aforementioned components of the apparatus 902 configured to perform the functions recited by the aforementioned means. As described supra, the apparatus 902 may include the TX processor 316/368, the RX processor 356/370, and the controller/processor 359/375. As such, in one configuration, the aforementioned means may be the TX processor 316/368, the RX processor 356/370, and the controller/processor 359/375 configured to perform the functions recited by the aforementioned means.

The following aspects are illustrative only and may be combined with aspects of other embodiments or teachings described herein, without limitation.

Aspect 1 is a method of wireless communication at a first wireless device operating based on a first RAT, including: receiving a sidelink resource reservation from a second wireless device based on a second RAT, the sidelink resource reservation indicating a set of reserved resources; determining whether to exclude, from a candidate resource set for the first RAT within a sidelink resource pool for the first RAT, resources that overlap with the set of reserved resources for the second RAT; and transmitting a sidelink transmission using one or more sidelink transmission resources selected from the candidate resource set in the sidelink resource pool for the first RAT.

Aspect 2 is the method of aspect 1, further including: using one or more metrics for the sidelink resource reservation for the first RAT to determine whether to exclude the set of reserved resources for the second RAT from the candidate resource set for the first RAT within the sidelink resource pool for the first RAT.

Aspect 3 is the method of any of aspects 1-2, further including: excluding the resources that overlap with the set of reserved resources for the second RAT from the candidate resource set for the first RAT, where the first wireless device transmits the sidelink transmission using the one or more sidelink transmission resources in the sidelink resource pool for the first RAT that are non-overlapping with the set of reserved resources.

Aspect 4 is the method of any of aspects 1-3, where the first wireless device excludes, from the candidate resource set for the first RAT, the resources that partially overlap with the set of reserved resources for the second RAT.

Aspect 5 is the method of any of aspects 1-4, where the first RAT includes NR sidelink communication and the second RAT includes LTE sidelink communication.

Aspect 6 is the method of any of aspects 1-5, where the NR sidelink communication comprises NR V2X communication and the LTE sidelink communication comprises LTE V2X communication.

Aspect 7 is the method of any of aspects 1-6, where the one or more metrics are for a periodic sidelink resource reservation.

Aspect 8 is the method of any of aspects 1-7, where the one or more metrics includes a priority of the set of reserved resources for the first RAT based on at least one of: a PPPP level for sidelink communication based on the second RAT, a configured PPPP for the sidelink communication based on the first RAT, or a highest PPPP level for the sidelink communication based on the first RAT.

Aspect 9 is the method of any of aspects 1-8, where the one or more metrics includes at least one of a RSRP threshold or a priority metric for the sidelink resource reservation for the first RAT.

Aspect 10 is the method of any of aspects 1-9, where the RSRP threshold or the priority metric is for a periodic sidelink reservation for the first RAT.

Aspect 11 is the method of any of aspects 1-10, further including: determining an RSRP of the set of reserved resources of the first RAT based on an RSRP measurement for one or more of: a PSSCH of the sidelink resource reservation from the second wireless device, or a PSCCH of the sidelink resource reservation from the second wireless device.

Aspect 12 is the method of any of aspects 1-11, where the first wireless device determines the RSRP of the set of reserved resources based on a combination of a first RSRP measurement of the PSCCH and a second RSRP measurement of the PSSCH.

Aspect 13 is the method of any of aspects 1-12, further including: determining a combined RSRP measurement based on a weighted average of the first RSRP measurement and the second RSRP measurement.

Aspect 14 is the method of any of aspects 1-13, further including: applying a scaling factor to the RSRP.

Aspect 15 is the method of any of aspects 1-14, further including: using a measured RSRP to determine whether to exclude the set of reserved resources for the second RAT from the candidate resource set for the first RAT.

Aspect 16 is the method of any of aspects 1-15, further including: using one or more metrics, that are different than a set of metrics that the first wireless device applies for sidelink resource reservations of the first RAT, from the candidate resource set for the first RAT.

Aspect 17 is the method of any of aspects 1-16, where the one or more metrics includes a higher priority level for the sidelink resource reservation based on the second RAT than for the sidelink resource reservations based on the first RAT.

Aspect 18 is the method of any of aspects 1-17, where the one or more metrics includes a lower RSRP threshold for the sidelink resource reservation based on the second RAT than for the sidelink resource reservations based on the first RAT.

Aspect 19 is the method of any of aspects 1-18, where the lower RSRP threshold comprises a minus infinite RSRP threshold.

Aspect 20 is the method of any of aspects 1-19, further including: excluding an expanded set of frequency resources based on the sidelink resource reservation.

Aspect 21 is the method of any of aspects 1-20, where the first wireless device excludes a full bandwidth of the sidelink resource pool during time resources reserved by the sidelink resource reservation.

Aspect 22 is the method of any of aspects 1-21, further including: using a distance between the first wireless device and the second wireless device to determine whether to exclude the set of reserved resources for the second RAT from the candidate resource set for the first RAT.

Aspect 23 is an apparatus for wireless communication of a first wireless device operating based on a first RAT. The apparatus includes a memory and at least one processor coupled to the memory and configured to perform the methods of any of examples 1-22.

Aspect 24 is an apparatus for wireless communication of a first wireless device operating based on a first RAT. The apparatus includes means for performing the methods of any of examples 1-22.

Aspect 25 is a computer-readable medium storing computer executable code, the code when executed by a processor cause the processor to perform the methods of any of examples 1-22.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless device operating based on a first radio access technology (RAT), comprising:
   receiving a sidelink resource reservation from a second wireless device based on a second RAT, the sidelink resource reservation indicating a set of reserved resources, the first RAT being different from the second RAT;
   determining whether to exclude, from a candidate resource set for the first RAT within a sidelink resource pool for the first RAT, resources overlapping with the set of reserved resources for the second RAT using a lower reference signal received power (RSRP) threshold for the sidelink resource reservation based on the second RAT than for sidelink resource reservations based on the first RAT; and
   transmitting a sidelink transmission using one or more sidelink transmission resources selected from the candidate resource set in the sidelink resource pool for the first RAT.

2. The method of claim 1, further comprising:
   excluding the resources overlapping with the set of reserved resources for the second RAT from the candidate resource set for the first RAT,
   wherein transmitting the sidelink transmission includes transmitting the sidelink transmission using the one or more sidelink transmission resources in the sidelink resource pool for the first RAT that are non-overlapping with the set of reserved resources.

3. The method of claim 1, further comprising:
   excluding, from the candidate resource set for the first RAT, the resources partially overlapping with the set of reserved resources for the second RAT.

4. The method of claim 1, wherein the first RAT includes new radio (NR) sidelink communication and the second RAT includes long term evolution (LTE) sidelink communication.

5. The method of claim 4, wherein the NR sidelink communication comprises NR vehicle-to-everything (V2X) communication and the LTE sidelink communication comprises LTE V2X communication.

6. The method of claim 1, further comprising:
   using one or more metrics for a second sidelink resource reservation for the first RAT to determine whether to exclude the set of reserved resources for the second RAT from the candidate resource set for the first RAT within the sidelink resource pool for the first RAT.

7. The method of claim 6, wherein the one or more metrics are for a periodic sidelink resource reservation.

8. The method of claim 6, wherein the one or more metrics include a priority of the set of reserved resources for the first RAT based on at least one of:
   a ProSe per packet priority (PPPP) level for sidelink communication based on the second RAT,
   a configured PPPP for the sidelink communication based on the first RAT, or
   a highest PPPP level for the sidelink communication based on the first RAT.

9. The method of claim 6, wherein the one or more metrics include at least one of a RSRP threshold or a priority metric for the second sidelink resource reservation for the first RAT.

10. The method of claim 9, wherein the RSRP threshold or the priority metric is for a periodic sidelink reservation for the first RAT.

11. The method of claim 1, further comprising:
    determining an RSRP of the set of reserved resources of the first RAT based on an RSRP measurement for one or more of:
    a physical sidelink shared channel (PSSCH) of the sidelink resource reservation from the second wireless device, or
    a physical sidelink control channel (PSCCH) of the sidelink resource reservation from the second wireless device.

12. A method of wireless communication at a first wireless device operating based on a first radio access technology (RAT), comprising:

receiving a sidelink resource reservation from a second wireless device based on a second RAT, the sidelink resource reservation indicating a set of reserved resources;

determining a reference signal received power (RSRP) of the set of reserved resources of the first RAT based on a combination of:

a first RSRP measurement of a physical sidelink shared channel (PSSCH) of the sidelink resource reservation from the second wireless device, and a second RSRP measurement of a physical sidelink control channel (PSCCH) of the sidelink resource reservation from the second wireless device;

determining whether to exclude, from a candidate resource set for the first RAT within a sidelink resource pool for the first RAT, resources overlapping with the set of reserved resources for the second RAT; and transmitting a sidelink transmission using one or more sidelink transmission resources selected from the candidate resource set in the sidelink resource pool for the first RAT.

13. The method of claim 12, further comprising:
determining a combined RSRP measurement based on a weighted average of the first RSRP measurement and the second RSRP measurement.

14. The method of claim 12, further comprising:
applying a scaling factor to the RSRP.

15. The method of claim 1, further comprising:
using one or more metrics, that are different than a set of metrics to be applied for the sidelink resource reservations of the first RAT, to determine whether to exclude the set of reserved resources for the second RAT from the candidate resource set for the first RAT, wherein the one or more metrics include the lower RSRP threshold.

16. The method of claim 15, wherein the one or more metrics further include a higher priority level for the sidelink resource reservation based on the second RAT than for the sidelink resource reservations based on the first RAT.

17. The method of claim 15, wherein the lower RSRP threshold is based on a negative infinite threshold value.

18. The method of claim 15, further comprising:
excluding an expanded set of frequency resources than the set of reserved resources based on the sidelink resource reservation.

19. The method of claim 1, further comprising:
excluding a full bandwidth of the sidelink resource pool during time resources reserved by the sidelink resource reservation.

20. The method of claim 1, further comprising:
using a distance between the first wireless device and the second wireless device to determine whether to exclude the set of reserved resources for the second RAT from the candidate resource set for the first RAT.

21. An apparatus for wireless communication at a first wireless device operating based on a first radio access technology (RAT), comprising:

a memory; and
at least one processor coupled to the memory, the at least one processor being configured to:
receive a sidelink resource reservation from a second wireless device based on a second RAT, the sidelink resource reservation indicating a set of reserved resources, the first RAT being different from the second RAT;
determine whether to exclude, from a candidate resource set for the first RAT within a sidelink resource pool for the first RAT, resources overlapping with the set of reserved resources for the second RAT using a lower reference signal received power (RSRP) threshold for the sidelink resource reservation based on the second RAT than for sidelink resource reservations based on the first RAT; and
transmit a sidelink transmission using one or more sidelink transmission resources selected from the candidate resource set in the sidelink resource pool for the first RAT.

22. The apparatus of claim 21, wherein the at least one processor is further configured to:
exclude the resources overlapping with the set of reserved resources for the second RAT from the candidate resource set for the first RAT, wherein to transmit the sidelink transmission the at least one processor is further configured to
transmit the sidelink transmission using the one or more sidelink transmission resources in the sidelink resource pool for the first RAT that are non-overlapping with the set of reserved resources.

23. The apparatus of claim 21, further comprising:
at least one antenna coupled to the at least one processor, wherein the at least one processor is further configured to:
exclude, from the candidate resource set for the first RAT, the resources partially overlapping with the set of reserved resources for the second RAT.

24. An apparatus for wireless communication at a first wireless device operating based on a first radio access technology (RAT), comprising:
means for receiving a sidelink resource reservation from a second wireless device based on a second RAT, the sidelink resource reservation indicating a set of reserved resources the first RAT being different from the second RAT;
means for determining whether to exclude, from a candidate resource set for the first RAT within a sidelink resource pool for the first RAT, resources overlapping with the set of reserved resources for the second RAT using a lower reference signal received power (RSRP) threshold for the sidelink resource reservation based on the second RAT than for sidelink resource reservations based on the first RAT; and
means for transmitting a sidelink transmission using one or more sidelink transmission resources selected from the candidate resource set in the sidelink resource pool for the first RAT.

25. The apparatus of claim 24, further comprising means for excluding the resources overlapping with the set of reserved resources for the second RAT from the candidate resource set for the first RAT, and wherein the means for transmitting are configured to transmit the sidelink transmission using the one or more sidelink transmission resources in the sidelink resource pool for the first RAT that are non-overlapping with the set of reserved resources.

26. The apparatus of claim 24, further comprising means for excluding, from the candidate resource set for the first RAT, the resources partially overlapping with the set of reserved resources for the second RAT.

27. A non-transitory computer-readable storage medium storing computer executable code for wireless communication at a first wireless device operating based on a first radio access technology (RAT), the code when executed by a processor cause the processor to:
receive a sidelink resource reservation from a second wireless device based on a second RAT, the sidelink resource reservation indicating a set of reserved resources, the first RAT being different from the second RAT;

determine whether to exclude, from a candidate resource set for the first RAT within a sidelink resource pool for the first RAT, resources overlapping with the set of reserved resources for the second RAT using a lower reference signal received power (RSRP) threshold for the sidelink resource reservation based on the second RAT than for sidelink resource reservations based on the first RAT; and transmit a sidelink transmission using one or more sidelink transmission resources selected from the candidate resource set in the sidelink resource pool for the first RAT.

28. The apparatus of claim 21, wherein the at least one processor is further configured to:
determine an RSRP of the set of reserved resources of the first RAT based on an RSRP measurement for one or more of:
a physical sidelink shared channel (PSSCH) of the sidelink resource reservation from the second wireless device, or
a physical sidelink control channel (PSCCH) of the sidelink resource reservation from the second wireless device.

29. The apparatus of claim 21, wherein the at least one processor is further configured to:
use one or more metrics, that are different than a set of metrics to be applied for the sidelink resource reservations of the first RAT, to determine whether to exclude the set of reserved resources for the second RAT from the candidate resource set for the first RAT, wherein the one or more metrics include the lower RSRP threshold, wherein the one or more metrics further include a higher priority level for the sidelink resource reservation based on the second RAT than for the sidelink resource reservations based on the first RAT.

30. The apparatus of claim 21, wherein the at least one processor is further configured to:
exclude a full bandwidth of the sidelink resource pool during time resources reserved by the sidelink resource reservation.

31. The apparatus of claim 21, wherein the at least one processor is further configured to:
use a distance between the first wireless device and the second wireless device to determine whether to exclude the set of reserved resources for the second RAT from the candidate resource set for the first RAT.

32. The non-transitory computer-readable medium of claim 27, wherein the code when executed by the processor further causes the processor to:
exclude the resources overlapping with the set of reserved resources for the second RAT from the candidate resource set for the first RAT; and
transmit the sidelink transmission using the one or more sidelink transmission resources in the sidelink resource pool for the first RAT that are non-overlapping with the set of reserved resources.

33. The non-transitory computer-readable medium of claim 27, wherein the code when executed by the processor further causes the processor to:
exclude, from the candidate resource set for the first RAT, the resources partially overlapping with the set of reserved resources for the second RAT.

34. An apparatus for wireless communication at a first wireless device operating based on a first radio access technology (RAT), comprising:
a memory; and
at least one processor coupled to the memory, the at least one processor being configured to:
receive a sidelink resource reservation from a second wireless device based on a second RAT, the sidelink resource reservation indicating a set of reserved resources;
determine a reference signal received power (RSRP) of the set of reserved resources of the first RAT based on a combination of:
a first RSRP measurement of a physical sidelink shared channel (PSSCH) of the sidelink resource reservation from the second wireless device, and
a second RSRP measurement of a physical sidelink control channel (PSCCH) of the sidelink resource reservation from the second wireless device;
determine whether to exclude, from a candidate resource set for the first RAT within a sidelink resource pool for the first RAT, resources overlapping with the set of reserved resources for the second RAT; and
transmit a sidelink transmission using one or more sidelink transmission resources selected from the candidate resource set in the sidelink resource pool for the first RAT.

35. The apparatus of claim 34, wherein the at least one processor is further configured to:
determine a combined RSRP measurement based on a weighted average of the first RSRP measurement and the second RSRP measurement.

36. The apparatus of claim 34, wherein the at least one processor is further configured to:
apply a scaling factor to the RSRP.

37. An apparatus for wireless communication at a first wireless device operating based on a first radio access technology (RAT), comprising:
means for receiving a sidelink resource reservation from a second wireless device based on a second RAT, the sidelink resource reservation indicating a set of reserved resources;
means for determining a reference signal received power (RSRP) of the set of reserved resources of the first RAT based on a combination of:
a first RSRP measurement of a physical sidelink shared channel (PSSCH) of the sidelink resource reservation from the second wireless device, and
a second RSRP measurement of a physical sidelink control channel (PSCCH) of the sidelink resource reservation from the second wireless device;
means for determining whether to exclude, from a candidate resource set for the first RAT within a sidelink resource pool for the first RAT, resources overlapping with the set of reserved resources for the second RAT; and
means for transmitting a sidelink transmission using one or more sidelink transmission resources selected from the candidate resource set in the sidelink resource pool for the first RAT.

38. The apparatus of claim 37, further comprising:
means for determining a combined RSRP measurement based on a weighted average of the first RSRP measurement and the second RSRP measurement.

39. The apparatus of claim 37, further comprising:
means for applying a scaling factor to the RSRP.

40. A non-transitory computer-readable storage medium storing computer executable code at a first wireless device operating based on a first radio access technology (RAT), the code when executed by a processor cause the processor to:
  receive a sidelink resource reservation from a second wireless device based on a second RAT, the sidelink resource reservation indicating a set of reserved resources;
  determine a reference signal received power (RSRP) of the set of reserved resources of the first RAT based on a combination of:
    a first RSRP measurement of a physical sidelink shared channel (PSSCH) of the sidelink resource reservation from the second wireless device, and
    a second RSRP measurement of a physical sidelink control channel (PSCCH) of the sidelink resource reservation from the second wireless device;
  determine whether to exclude, from a candidate resource set for the first RAT within a sidelink resource pool for the first RAT, resources overlapping with the set of reserved resources for the second RAT; and
  transmit a sidelink transmission using one or more sidelink transmission resources selected from the candidate resource set in the sidelink resource pool for the first RAT.

41. The non-transitory computer-readable medium of claim 40, wherein the code when executed by the processor further causes the processor to:
  determine a combined RSRP measurement based on a weighted average of the first RSRP measurement and the second RSRP measurement.

42. The non-transitory computer-readable medium of claim 40, wherein the code when executed by the processor further causes the processor to:
  apply a scaling factor to the RSRP.

* * * * *